United States Patent Office 2,961,443
Patented Nov. 22, 1960

2,961,443

ORGANIC COMPOUNDS OF BORON

Eugene C. Ashby, Walter E. Foster, Jesse R. Mangham, and Tillmon H. Pearson, all of Baton Rouge, La., assignors to Ethyl Corporation, New York, N.Y., a corporation of Delaware No Drawing. Filed Apr. 10, 1957, Ser. No. 651,797

4 Claims. (Cl. 260—290)

This invention relates to the preparation of organic compounds of boron.

Certain organic derivatives of boron have been synthesized by the reaction betwen a dialkyl or diaryl derivative of mercury or zinc and a boron halide. For example, the carefully controlled reaction between dimethyl zinc and boron trichloride was used by E. Wiberg and W. Ruschmann, Berichte, 70, 1583, (1937) to prepare the methyl dichloroborane and the dimethyl chloroborane. However, these compounds are unstable and readily disproportionate to trimethyl borane and boron trichloride. These and certain other organic derivatives of boron are more satisfactorily synthesized by the employment of a Grignard reagent and boron halides reacted as their ether complexes. In this manner both the trialkyl and triaryl compounds have been prepared. The alkyl derivatives, for example, are prepared by the methods disclosed by H. C. Brown and R. B. Johannesen, Journal of the American Chemical Society, 75, 19, (1953), and the aryl derivatives by procedures exemplified by the work of E. Krause and H. Polack, Berichte, 59, 777, (1926). Thus, these and other methods have been utilized by workers in the field to prepare a variety of organo boron compounds, some of which are more difficulty obtainable than others, such as the mono-organo derivatives and the mixed organo derivatives. However, the art propounds no uniformly applicable method for the preparation of these difficultly obtainable organic derivatives of boron. Thus, in following the procedures disclosed in the prior art, there will be synthesized compounds, in many instances, which are unstable even at extremely low temperatures, and which in order to maintain stability must be further reacted in order to formulate the compound into a suitable state for convenient isolation or storage. A clear illustration involves the mixed alkyls of boron, such as dimethyl ethyl boron, which disproportionate very readily even at temperatures in the region of —20° C. according to the work of T. D. Parsons and D. M. Ritter, Journal of the American Chemical Society, 76, 1710 (1954). Thus, the inherent tendency of boron compounds to disproportionate makes it extremely difficult, using any of the methods in the art, to obtain in a simple and economical manner controlled organo substitution of boron.

It is, therefore, an object of this invention to prepare difficultly obtainable organic compounds of boron. It is, additionally, an object of this invention to prepare organic compounds of boron which heretofore have been wholly unobtainable. A still further object is the preparation of organo boron compounds in a simple and economical manner suitable for commercial adaptability.

In accordance with these objects and others which shall appear hereinafter, a stable organometallic of the type $R_yM$ wherein R is a hydrocarbon radical, M is any metal which will form a stable organometallic, and y is an integer equal to the valence of M, is reacted with an amine complex of a boron compound having the general formula $$R'_aBX_{(3-a)}$$
$$\cdot\cdot$$
$$A$$

wherein R' is a hydrocarbon radical, X is a halide or alcohol residue, A is any primary, secondary or tertiary amine or ammonia, and $a$ is an integer having a value between 0 and 3. In a preferred embodiment of this invention, a tertiary amine complex of a boron halide is reacted with an alkali metal alkyne, such as, for example, the reaction between the pyridine complex of boron trifluoride and sodium acetylide, as more fully illsutrated in the following example. In this and other examples which occur below, all parts and percentages are by weight.

*Example I*

Into a reaction flask provided with means for heating, cooling, stirring, and continuous addition was added 11 parts of boron trifluoride in 200 parts of pyridine. To this mixture was added in a continuous steady stream 24 parts of sodium acetylide in 200 parts of xylene over a 15 minute period while maintaining the reaction temperature at 0° C. After completion of this addition the reaction mixture was warmed to 25° C. whereupon the mixture turned purple, some solid appearing in the purple solution. This solid was separated from the reaction mixture in a dry box by vacuum filtration. The solid appeared purple, but when completely dry, turned a light tan color. Further identification revealed the solid to be sodium fluoride. The purple filtrate amounting to about 450 parts was distilled through a glass helix packed column so as to remove the pyridine. Upon completion of the distillation, a purple solid was deposited in the reaction container. This solid was vacuum filtered and recrystallized in acetone water to produce colorless needles having a melting point of 153° C. (plus or minus 0.5° C.) and thereafter dried in a dry box. The desired triethynyl boron pyridine product was obtained in a 60 percent yield.

In the stable organometallic compounds employed in the process of this invention as illustrated hereinabove by the formula $R_yM$, R is as defined hereinbefore and, more specifically, is a lower hydrocarbon radical, that is, one containing between about 1 to 10 carbon atoms, preferably lower alkyl and alkynyl radicals; M is any metal which will form a stable organometallic, preferably, those metals selected from the groups I–A, II–A, II–B, II–A, within which the metals sodium, lithium, potassium, magnesium, calcium, zinc, mercury, boron and aluminum are especially preferred for employment in the process of this invention; and, furthermore, y is an integer having a value as defined hereinbefore. Thus, the radical R can be alkyl radicals, such as, for example, methyl, benzyl, isopropyl, hexyl, 1-methyl octyl, decyl, hexadecyl; aryl radicals, such as, phenyl, tolyl, naphthyl, 4-anthryl, phenanthryl; alkenyl radicals, such as, 1-propenyl, 1-butenyl, 3-methyl-6-hexyl-1-octenyl; alkynyl radicals, such as, ethynyl, 1-butynyl, 1-hexynyl, 3,3-dimethyl-1-butynyl, 1-butene-3-ynyl; cycloalkyl radicals, such as, cyclopentyl, cyclohexyl, cycloheptyl; cycloalkenyl radicals, such as, 1,3-cyclohexadienyl, cyclopentenyl, and the like. Furthermore, other metals than those enumerated hereinbefore can be employed as the metallic substituent in the stable organometallics employed as a reactant in the process of this invention, such as, for example, rubidium, cesium, barium, scandium, zirconium, vanadium, chromium, cobalt, palladium, nickel, copper, silver, mercury, gallium, indium, silicon, lead, tin, bismuth and the like.

In the boron compound represented hereinabove by the general formula $$R'_a BX_{(3-a)}$$
$$\ddot{A}$$

$a$ is as defined hereinbefore; the radical $R'$ is as defined for the radical R hereinbefore, but may or may not be the same radical within the definitive group. X is a halide or alcohol residue as defined hereinbefore. When X is a halide, it is preferred to employ chlorine or fluorine. When X is an alcohol residue, it is preferred to employ alcohol residues containing between about 1 to 10 carbon atoms, said residues being selected from the groups alkoxy or aryloxy, such as methoxy, ethoxy, butoxy, isopropoxy, phenoxy, methoxy benzene, isopropoxy benzene and the like. However, it is not intended that the alcohol residues be limited purely to alkoxy and aryloxy. Certain conjugated alcohol residues such as alkenes or cycloalkene alcohol residues, as for example, 1-oxy-2-butene, or 1-oxy-1,3-cyclopentadiene may additionally be employed. The amine substituent represented by A is as defined hereinbefore. Thus, ammonia and any primary, secondary or tertiary amine, wherein the residues replacing the amine hydrogen are hydrocarbon residues, may be employed. Therefore, the hydrocarbon residue of the amine can be alkyl, cycloalkyl, aryl or a mixture thereof; furthermore, heterocyclic amines are successfully utilized in the process of this invention. Typical, but non-limiting, examples of primary amines include alkyl amines, such as the homologous methyl, ethyl, propyl, butyl, amyl, hexyl amines and the like, up to and including amines having about 10 carbon atoms in the hydrocarbon chain. Additionally, branched chain monoalkyl amines such as isobutyl amine, 3-amino-4-methyl pentane, 1-amino propane, 2-amino butane and the like can also be employed. Specific, but non-limiting, examples of primary amines containing hydrocarbon residues consisting of aryl groups include m-, o-, and p-amino disphenyl methane, phenyl amine, benzyl amine, napthyl amine, o-, m-, and p-ethyl aniline, p-isobutyl aniline, p-isopropyl aniline and the like. Examples of secondary amines which can be used include dialkyl amines such as diethyl amine, dipropyl amine, dibutyl amine, 2-methyl amino butane, 2-ethyl amino butane and the like. Furthermore, mixed aryl-alkyl secondary amines can be employed such as phenylethyl amine, benzylmethyl amine and the like. Dialkyl secondary amines such as diphenyl amine, dibenzyl amine, dinaphthyl amine and the like can also be employed. Additionally, cycloalkyl amino compounds may be employed in the process of this invention and typical examples of such cycloalkyl amines are cyclohexyl amine, N-butyl cyclohexyl amine, N-ethyl cyclohexyl amine, and the like. Also, tertiary amines may be employed in the process of this invention, such as trialkyl tertiary amines like the homologous methyl, ethyl, propyl, butyl, pentyl, hexyl amines and the like. Further, branched chain tertiary amines can be used such as triisopropyl amine, di-tert-butyl methyl amine, and the like. Mixed alkyl-aryl tertiary amines are employed in some instances and typical examples include methyl diphenyl amine, diethyl phenyl amine, cyclohexyl phenyl methylamine and the like. Heterocyclic tertiary amines can be utilized in the process of this invention and typical, but non-limiting examples include heterocyclic amines such as pyridine and the homologs thereof, quinoline, piperidine, acridine, isoquinoline and the like.

The reaction occurring in Example I may be depicted by the following formula $$BF_3 \cdot pyridine + 3NaC \equiv CH \rightarrow B(C \equiv CH) \cdot pyridine + 3NaF$$

However, attempted analogous procedures employing identical reaction conditions with the exception that the $BF_3$ reactant was reacted as an etherate complex, gave negative results as illustrated by the following example.

*Example II*

The process of Example I is followed with the exception that 11 parts of boron trifluoride in 200 parts of absolute ether is utilized. Immediately upon contact of the $BF_3$ etherate with the sodium acetylide, a dark reaction mass begins to form. Upon completion of the addition, the reaction mixture is a completely blackened polymerization product. Analysis showed no trace of any acetylenic product. Similar results were obtained by following the process of Example I utilizing $BF_3$ complexed with other ethers such as diglyme, diethyl ether, tetrahydrofuran and the like. Further, negative results were obtained when $BF_3$ in an uncomplexed state was reacted in a hydrocarbon medium such as benzene, hexane, toluene, ethane, naphthalene and the like.

Furthermore, an attempt was made to prepare triethynyl boron by reversing the addition of the reagents, that is, boron trifluoride in either solution was added to excess sodium acetylide at $-70°$ C. In this reaction a minimum of black polymerization product was noticed and a substantial yield of sodium tetraethynyl borate and sodium fluoro borate was produced. However, no triethynyl boron etherate was present. The reaction is represented by the following formula $$4BF_3 \cdot etherate + 4NaC\ CH \rightarrow (HC\ C)_4 BNa + 3NaBF_4$$

Thus, by reacting stable organomethallics with boron compounds of the type defined hereinbefore, stable amine complexed organo boron compounds as more fully illustrated in the following general formula are produced.

$$R'_a R_b B X_c$$
$$\ddot{A}$$

wherein R and R' are the same or different organic radicals as defined hereinbefore and X is an alcohol residue or halide as defined hereinbefore; $a$ is an integer from 0 to 2; $b$ is an integer of 1 to 3; and $c$ is an integer having a value from 0 to 2; $a+b+c$ being equal to no more than 3. Typical, but non-limiting, examples of the compounds produced by the process of this invention are triethyl boron ammonia, trimethyl boron dimethyl amine, triethyenyl boron methyl amine, triethynyl boron trimethyl amine, triethynyl boron pyridine, tridecyl boron pyridine, triphenyl boron ammonia, dimethyl ethyl boron ammonia, diethyl phenyl boron ammonia, diethynyl methyl boron pyridine, ethenyl dimethyl boron dimethyl amine, diphenyl methyl boron methyl amine, methyl ethyl n-propyl boron ammonia, methyl ethenyl decyl boron pyridine, cyclohexyl methyl phenyl boron methyl amine, methyl ethenyl ethynyl boron ammonia, dimethyl fluoro boron ammonia, diethenyl chloroboron methyl amine, diethynyl bromo ammonia, diphenyl methoxy boron methyl amine, methyl phenyl phenoxy boron ammonia, methyl dimethoxy boron ammonia, ethyl diethoxy boron pyridine, phenyl dipentoxy boron ammonia, hexyl dihenoxy boron methyl amine, isopropyl methoxy ethoxy boron dimethyl amine, o-methyl phenyl dimethoxy ammonia and the like.

The proportions employed in the process of this invention are such that stoichiometric requirements are fulfilled, that is, they are critical only in so far as the desired reaction product dictates. Thus, when the trisubstituted boron compound is desired, a reaction ratio of 3:1 organometallic to boron compound is employed. When the disubstituted derivative is desired, a 2:1 ratio is employed and likewise a 1:1 ratio when the mono-substituted derivative is desired. In order to obtain the benefits of this invention, it is preferred to maintain reaction proportions as near to the theoretical stoichiometry as feasible. However, up to about 5 percent excess of either reagent will not deter from the successful completion of the reaction. It should be noted, however, that during the addition it is necessary to maintain the boron compound in excess of the organometallic reactant and it is for this reason that the organometallic is added in a slow steady manner to the boron reactant.

The temperatures employed in the process of this invention are dependent upon the relative stability of amine complexed boron compound employed and upon the product obtained. Thus, for example, higher temperatures may be employed when boron trifluoride complexed with ammonia is reacted with the appropriate lower alkyl or alkynyl organometallic than when, for example, trimethyl amine is complexed with boron trifluoride and subsequently reacted with an organometallic such as tertiary butyl lithium. This phenomenon has many explanations, for example, the more sterically hindered amines such as dimethyl, phenyl methyl, diethyl and the like form less stable complexes with boron compounds than those amines which are relatively unhindered as, for example, ammonia or methyl amine. Likewise, the stability of the amine complex produced determines the upper limit of the temperature range of the reaction. With these considerations in mind, the process of this invention is generally conducted at temperatures between about 0 to 100° C., and preferably 0 to 50° C., dependent upon the relative stability of the coordinating amine complex and of the products produced. In the following example, this observation will be more fully apparent.

*Example III*

Into a reaction flask provided with means for heating, refluxing, continuous addition and stirring is added 85 parts of boron trifluoride ammonia in 300 parts of pyridine. The mixture is heated to 100° C. and 114 parts of triethyl aluminum are added over a period of 15 minutes. Upon completion of the addition, the reaction mixture is refluxed at 100° C. for several minutes and then allowed to cool to room temperature following which the white solid containing mixture is filtered. The filtrate is then distilled at atmospheric pressure so as to remove the last traces of solvent. Whereupon the product ethyl difluoroboron ammonia is obtained.

The solvents used in the process of this invention are not critical so long as the boron reactant has been complexed with an appropriate amine. Thus, hydrocarbons, ethers and amines may be employed. When an amine solvent is employed the boron reactant may be introduced and complexed in situ. Furthermore, mixtures of solvents may be employed as evidenced by the process of Example I. Thus, for example, the organometallic can be dissolved in a hydrocarbon or ether, such as benzene or absolute ether and introduced into a mixture comprising the boron reactant and a solvent, such as, pyridine.

The concentrations employed in the process of this invention are, additionally, not critical in so long as suitable contact is effected between reactants. Thus, it is usually desirable to employ between about 15 to 40 percent by weight of the reaction mixture as solvent.

Reaction times vary between about 15 minutes to 2 hours being directly dependent upon the relative reactivities of the reactants employed. Thus, the relative bond strengths, reactant proportions, reaction temperature, concentrations all have a direct bearing on reaction rates, but in most cases the reaction should not require more than two hours for completion and, furthermore, in some cases, it is feasible that a reaction time of less than 15 minutes might be effective. The following examples more clearly illustrate the process of this invention.

*Example IV*

The process of Example I is utilized with the exception that 279.4 parts of boron trichloride dimethyl amine is reacted with 306.9 parts of di(1-propynyl)magnesium. The compound tri-(1-propynyl)boron complexed with dimethyl amine was obtained in substantial yields.

*Example V*

The process of Example I is utilized with the exception that 162.2 parts of boron trichloride ethyl amine is reacted with 300 parts of phenyl sodium to obtain the compound triphenyl boron ethyl amine.

*Example VI*

Into a reaction flask provided with means for refluxing, heating, continuous addition and stirring is added 140.8 parts of n-propyl dichloro boron ammonia in 200 parts of ether. The mixture is heated to 50° C. and 97.8 parts of triethyl boron are added over a 20 minute period. Upon completion of the addition, the reaction mixture is refluxed at atmospheric pressure for several minutes and then allowed to cool to room temperature following which the solid material appearing in the reaction mixture is filtered. The filtrate is distilled at a pressure of 1 mm. so as to remove the last traces of solvent whereupon the product diethyl n-propyl boron ammonia is obtained in good yields.

*Example VII*

In the process of Example VI, however in this case, employing 148.8 parts of trimethoxy boron dimethyl amine and 97.9 parts of benzyl lithium so that the desired product tribenzyl boron dimethyl amine was obtained.

*Example VIII*

Into a reaction flask provided with means for stirring, refluxing, and continuous addition is added 172.8 parts of ethyl diethoxy boron diethyl amine in 250 parts of absolute ether. To the reaction mixture is added, over a period of 1 hour, 50.4 parts of sodium butyl acetylide while refluxing the reaction mixture at atmospheric pressure. Solid impurities are removed from the reaction mixture by vacuum filtration and the filtrate is distilled at 1 mm. of pressure to remove the last traces of the ether solvent. Thus, the product ethyl di(butylethynyl)boron is obtained as the diethyl amine complex.

As disclosed in U.S. 2,234,581, the compounds produced in the process of this invention may be employed as oxidation inhibitors in mineral lubricating oils and greases where usage requires exposure to high temperatures in the presence of air or combustion gases. While the exact nature of these various compounds and the mechanisms by which they improve the lubricating oil are not readily understood, observation discloses a tendency to decrease sludging and thereby render those decomposition products formed under their influence freely soluble or at least dispersable in the oil, thus greatly diminishing any inherent precipitation tendencies. Furthermore, the alkynyl boron derivatives produced by the process of this invention are preferably utilized as high energy fuels.

We claim:

1. The amine complex of an alkynyl boron compound, wherein said alkynyl group is a lower alkynyl group and said amine is a nitrogenous compound selected from the group consisting of ammonia, primary hydrocarbon mono-amines, secondary hydrocarbon mono-amines, and non-heterocyclic hydrocarbon tertiary mono-amines wherein the hydrocarbon substituents of said primary, secondary and tertiary mono-amines contain no more than 10 carbon atoms, and heterocyclic amines selected from the group consisting of pyridine, piperidine, acridine and isoquinoline.

2. Triethynyl boron pyridine.
3. Triethynyl boron trimethyl amine.
4. Tri-(1-propynyl)boron dimethyl amine.

References Cited in the file of this patent

UNITED STATES PATENTS 2,234,581 Rosen ---------------- Mar. 11, 1941

OTHER REFERENCES

Parsons et al., J. Am. Chem. Soc., vol. 76, p. 1710 (1954).

Brown, J. Am. Chem. Soc., vol. 67, pp. 374–378 (1945).

Brown et al., J. Am. Chem. Soc., vol. 64, pp. 325–327 (1942).

UNITED STATES PATENT OFFICE
CERTIFICATION OF CORRECTION

Patent No. 2,961,443 November 22, 1960

Eugene C. Ashby et al.

It is hereby certified that error appears in the above numbered patent requiring correction and that the said Letters Patent should read as corrected below.

Column 2, line 19, for "illsutrated" read -- illustrated --; column 3, line 51, for "disphenyl" read -- diphenyl --; column 4, line 41, for "organomethallics" read -- organometallics --; line 56, for "triethyenyl" read -- triethynyl --; line 70, for "dihenoxy" read -- diphenoxy --.

Signed and sealed this 30th day of May 1961.

(SEAL)
Attest:

ERNEST W. SWIDER
Attesting Officer

DAVID L. LADD
Commissioner of Patents